(12) United States Patent
Murakami (10) Patent No.: US 7,830,303 B2
(45) Date of Patent: Nov. 9, 2010

(54) COHERENT INTEGRATION ENHANCEMENT METHOD, POSITIONING METHOD, STORAGE MEDIUM, COHERENT INTEGRATION ENHANCEMENT CIRCUIT, POSITIONING CIRCUIT, AND ELECTRONIC INSTRUMENT

(75) Inventor: Makoto Murakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 12/141,324

(22) Filed: Jun. 18, 2008

(65) Prior Publication Data
US 2008/0316095 A1 Dec. 25, 2008

(30) Foreign Application Priority Data
Jun. 19, 2007 (JP) ............................. 2007-160914

(51) Int. Cl.
*G01S 1/00* (2006.01)
(52) U.S. Cl. ........................... 342/357.12; 342/357.09
(58) Field of Classification Search ............ 342/357.09, 342/357.12
See application file for complete search history.

(56) References Cited

U.S. PATENT DOCUMENTS 6,625,239 B1 * 9/2003 Shiraishi et al. ............. 375/354
7,619,559 B2 * 11/2009 DiEsposti .............. 342/357.09
2004/0167713 A1 8/2004 Basch et al.

FOREIGN PATENT DOCUMENTS

JP 3787592 B2 4/2006
WO WO 00/14568 A1 3/2000

\* cited by examiner

*Primary Examiner*—Thomas H Tarcza
*Assistant Examiner*—Harry Liu
(74) *Attorney, Agent, or Firm*—Global IP Counselors, LLP (57) ABSTRACT

Integrated correlation values (I and Q integrated correlation values) between each of I and Q signals obtained from a received signal and a code replica are calculated by a coherent integration process performed by a correlation process circuit section 32. A coherent integration enhancement circuit section converts a phase angle θ of each of the I and Q integrated correlation values (IQ coordinate values) into a double angle, and further integrates the converted I and Q integrated correlation values (IQ coordinate values) to calculate I and Q enhanced integrated correlation values. An incoherent integration circuit section performs an incoherent integration process on the I and Q enhanced integrated correlation values. A coherent integration time T1 of the correlation circuit section is set to be 20 ms or less, and an integration time T2 of the coherent integration enhancement circuit section is set to be longer than 20 ms.

11 Claims, 9 Drawing Sheets

COHERENT INTEGRATION ENHANCEMENT METHOD, POSITIONING METHOD, STORAGE MEDIUM, COHERENT INTEGRATION ENHANCEMENT CIRCUIT, POSITIONING CIRCUIT, AND ELECTRONIC INSTRUMENT

Japanese Patent Application No. 2007-160914 filed on Jun. 19, 2007, is hereby incorporated by reference in its entirety.

BACKGROUND OF THE INVENTION

The present invention relates to a coherent integration enhancement method, a positioning method, a storage medium, a coherent integration enhancement circuit, a positioning circuit, and an electronic instrument.

The global positioning system (GPS) is widely known as a satellite positioning system, and is utilized for a car navigation system and the like. A GPS satellite signal is transmitted from each GPS satellite that orbits the earth. A GPS receiver calculates (locates) its present position based on the GPS satellite signals received from the GPS satellites.

The GPS receiver acquires and tracks the received GPS satellite signal, decodes a navigation message included in the GPS satellite signal, calculates the pseudo-range based on orbit information and time information of the GPS satellite included in the decoded navigation message, and calculates the present position. The GPS receiver acquires the GPS satellite signal (GPS satellite) by performing correlation calculations on the received signal and a code replica. The code replica is a signal that is pseudo-generated by the GPS receiver and simulates a coarse/acquisition (C/A) code (i.e., pseudo random noise (PRN) code) included in the acquisition target GPS satellite signal. Specifically, the GPS receiver performs a coherent process that calculates the correlation between the C/A code included in the received signal and the code replica using FFT calculations or the like, and an incoherent process that integrates the correlation values (coherent process results) to calculate an integrated correlation value. If the acquisition target GPS satellite signal is correct, the C/A code included in the GPS satellite signal coincides with the code replica (success). If the acquisition target GPS satellite signal is incorrect, the C/A code included in the GPS satellite signal does not coincide with the code replica (fail). Therefore, whether or not the GPS satellite signal has been successfully acquired can be determined using the calculated integrated correlation value. The GPS satellite signal can be acquired by performing correlation calculations on the received signal while changing the C/A code used as the code replica.

The following control is performed when performing correlation calculations. Specifically, the GPS receiver performs the coherent process and the incoherent process while changing the frequency of the code replica signal and the phase when calculating the correlation between the C/A code and the code replica. Specifically, the integrated correlation value becomes a maximum when the frequency of the code replica signal coincides with the frequency of the received signal (at an intermediate frequency) and the phase of the C/A code coincides with the phase of the code replica during correlation calculations (this phase is referred to as "code phase").

In the GPS, the integration time of the coherent process is limited to 20 ms. This is because the GPS satellite signal is a signal obtained by subjecting the C/A code to binary phase shift keying (BPSK) modulates using the navigation message, and the transmission rate of the navigation message is 50 bps (bit per sec). Specifically, data obtained by performing the coherent process for an integration time equal to or longer than 20 ms may include phase inversion of the navigation message. If the coherent integration is performed across phase inversion, the amplitude of the correlation value is reversed across phase inversion so that cancellation occurs. As a result, the integrated value decreases. Therefore, when acquiring the GPS satellite signal, the coherent integration process is performed for an integration time equal to or less than 20 ms, and the incoherent integration process (integration of only the magnitude) is then performed on the correlation value.

As technology that enables the coherent integration process for an integration time equal to or longer than 20 ms without being affected by phase inversion of the navigation message, technology has been known which obtains the inversion pattern and the timing of the navigation message from a base station (i.e., external server) and performs correlation calculations in a state in which the polarity of the navigation message included in the received signal is made identical (see Japanese Patent No. 3787592, for example).

However, the method disclosed in Japanese Patent No. 3787592 requires the external server that detects the inversion pattern and the timing of the navigation message. Moreover, the GPS receiver must perform real-time data communication with the external server. The GPS receiver must also measure or acquire accurate time information in order to achieve synchronization with the external server.

SUMMARY

According to one aspect of the invention, there is provided a coherent integration enhancement method comprising:

converting a phase angle of each of integrated correlation values in a quadrature coordinate system into a double angle, the integrated correlation values being obtained by a correlation process circuit that calculates correlation values between quadrature signals of a received positioning satellite signal and a code replica of a pseudo random noise (PRN) code and performs a coherent integration process on the correlation values; and integrating the integrated correlation values of which the phase angle has been converted into a double angle.

DETAILED DESCRIPTION OF THE EMBODIMENT

The invention may enable a positioning system such as a GPS positioning system to perform a coherent integration process over an integration time equal to or longer than a phase modulation cycle (20 ms in the GPS) by preventing cancellation of an integrated value due to phase inversion of a navigation message included in a satellite signal.

One embodiment of the invention relates to a coherent integration enhancement circuit comprising: a phase angle conversion section that converts a phase angle of each of integrated correlation values in a quadrature coordinate system into a double angle, the integrated correlation values being obtained by a correlation process circuit that calculates correlation values between quadrature signals of a received positioning satellite signal and a code replica of a pseudo random noise (PRN) code and performs a coherent integration process on the correlation values; and an integration section that integrates the integrated correlation values of which the phase angle has been converted by the phase angle conversion section.

Another embodiment of the invention relates to a coherent integration enhancement method comprising: converting a phase angle of each of integrated correlation values in a quadrature coordinate system into a double angle, the integrated correlation values being obtained by a correlation process circuit that calculates correlation values between quadrature signals of a received positioning satellite signal and a code replica of a pseudo random noise (PRN) code and performs a coherent integration process on the correlation values; and integrating the integrated correlation values of which the phase angle has been converted into a double angle.

According to the above configuration, the phase angle of each of the integrated correlation values in the quadrature coordinate system is converted into a double angle, the integrated correlation values being obtained by calculating the correlation values between the quadrature signals of the received positioning satellite signal and the code replica of the PRN code and performing the coherent integration process on the correlation values, and the integrated correlation values of which the phase angle has been converted into a double angle are integrated. In the GPS that is one type of positioning system utilizing a positioning satellite, for example, the GPS satellite signal (positioning satellite signal) transmitted from the GPS satellite is a signal obtained by subjecting the carrier wave to BPSK modulation using the navigation message, and the transmission rate of the navigation message is 50 bps. Therefore, the integration time of the coherent integration process has been limited to 20 ms or less. However, cancellation of the correlation value due to phase inversion of the navigation message can be prevented by converting the phase angle of the integrated correlation value calculated by the coherent integration process into a double angle and further integrating the resulting values. As a result, the integration time of the coherent integration process can be set to be 20 ms or more.

In the coherent integration enhancement circuit, the positioning satellite signal may be a signal that has been subjected to BPSK modulation; the correlation process circuit may perform a coherent integration process for a given unit time shorter than the phase modulation cycle; and the integration section may integrate the integrated correlation values for a period of time longer than the phase modulation cycle.

According to this configuration, the coherent integration process is performed for a given unit time shorter than the phase modulation cycle of the positioning satellite signal (i.e., a signal that has been subjected to BPSK modulation), and the integrated correlation values are integrated for a period of time longer than the phase modulation cycle. When the received positioning satellite is a signal that has been subjected to BPSK modulation, the amplitude of the correlation value may be reversed in the phase modulation cycle. Therefore, the integrated correlation values can be integrated for a period of time longer than the phase modulation cycle by performing the coherent integration process for a given unit time shorter than the phase modulation cycle and converting the phase angle into a double angle. The coherent integration process can be performed on the integrated correlation values for the integration time without being affected by cancellation of the correlation value due to phase inversion.

Another embodiment of the invention relates to a positioning circuit comprising: a correlation process circuit that calculates correlation values between quadrature signals of a received positioning satellite signal and a code replica of a PRN code and performs a coherent integration process on the correlation values; a phase angle conversion section that converts a phase angle of each of the integrated correlation values integrated by the correlation process circuit in a quadrature coordinate system into a double angle; an integration section that integrates the integrated correlation values of which the phase angle has been converted by the phase angle conversion section; a pseudo-range calculation section that calculates a pseudo-range between a positioning satellite that has transmitted the positioning satellite signal and a reception position based on an integration result of the integration section; and a positioning calculation section that calculates a present position based on the calculated pseudo-range.

Another embodiment of the invention relates to a positioning method comprising: calculating correlation values between quadrature signals of a received positioning satellite signal and a code replica of a PRN code and performing a coherent integration process on the correlation values; converting a phase angle of each of the integrated correlation values obtained by the coherent integration process in a quadrature coordinate system into a double angle; integrating the integrated correlation values of which the phase angle has been converted into a double angle; calculating a pseudo-range between a positioning satellite that has transmitted the positioning satellite signal and a reception position based on the integrated correlation values; and calculating a present position based on the calculated pseudo-range.

According to the above configuration, the phase angle of each of the integrated correlation values in the quadrature coordinate system is converted into a double angle, the integrated correlation values being obtained by calculating the correlation values between the quadrature signals of the received positioning satellite signal and the code replica of the PRN code and performing the coherent integration process on the correlation values, and the integrated correlation values of which the phase angle has been converted into a double angle are integrated. The pseudo-range, is calculated based on the integration result, and the present position is calculated based on the pseudo-range. In the GPS that is one type of positioning system utilizing a positioning satellite, for example, the GPS satellite signal (positioning satellite signal) transmitted from the GPS satellite is a signal obtained by subjecting the carrier wave to BPSK modulation using the navigation message, and the transmission rate of the navigation message is 50 bps. Therefore, the integration time of the coherent integration process has been limited to 20 ms or less. However, cancellation of the correlation value due to phase inversion of the navigation message can be prevented by converting the phase angle of the integrated correlation value calculated by the coherent integration process into a double angle and further integrating the resulting values. As a result, the integration time of the coherent integration process can be set to be 20 ms or more. This enables the present position to be located with higher accuracy.

In the above positioning circuit, the positioning satellite signal may be a signal that has been subjected to BPSK modulation; the correlation process circuit may perform the coherent integration process for a given unit time shorter than the phase modulation cycle; and the integration section may integrate the integrated correlation values for a period of time longer than the phase modulation cycle.

According to this configuration, the coherent integration process is performed for a given unit time shorter than the phase modulation cycle of the positioning satellite signal (i.e., a signal that has been subjected to BPSK modulation), and the integrated correlation values are integrated for a period of time longer than the phase modulation cycle. When the received positioning satellite is a signal that has been subjected to BPSK modulation, the amplitude of the correlation value may be reversed in the phase modulation cycle. Therefore, the integrated correlation values can be integrated for a period of time longer than the phase modulation cycle by performing the coherent integration process for a given unit time shorter than the phase modulation cycle and converting the phase angle into a double angle. The coherent integration process can be performed on the integrated correlation values for the integration time without being affected by cancellation of the correlation value due to phase inversion.

The above positioning circuit may further include an integration time setting section that variably sets an integration time of the integrated correlation values integrated by the integration section, and the integration section may integrate the integrated correlation values for the integration time set by the integration time setting section.

According to this configuration, the integration time of the integrated correlation values of which the phase angle has been converted into a double angle can be variably set.

The above positioning circuit may further include a startup detection section that detects startup of the positioning circuit, and the integration time setting section may variably set the integration time based on a period of time elapsed after the startup detection section has detected startup of the positioning circuit.

According to this configuration, the integration time of the integrated correlation values of which the phase angle has been converted into a double angle is variably set based on a period of time elapsed after startup of the positioning circuit has been detected.

The above positioning circuit may further include a code generation section that generates the code replica using an oscillation signal generated by a local oscillator, and the integration time setting section may determine whether or not a change in the oscillation signal generated by the local oscillator satisfies a change state condition used to determine whether or not appropriate positioning can be performed using the integration result of the integration section based on the received positioning satellite signal, and variably set the integration time based on the determination result.

According to this configuration, whether or not a change in the oscillation signal generated by the local oscillator and used to generate the code replica satisfies the change state condition used to determine whether or not appropriate positioning can be performed using the integration result based on the received positioning satellite signal, and the integration time is variably set based on the determination result. Therefore, an appropriate integration process corresponding to a change in the oscillation signal generated by the local oscillator can be performed, such as reducing the integration time when a change in the oscillation signal does not satisfy the change state condition.

The above positioning circuit may further include: a code generation section that generates the code replica using an oscillation signal generated by a local oscillator; and a code generation control section that controls the code generation section so that the frequency and the phase of the code replica generated by the code generation section coincide with the frequency and the phase of the received positioning satellite signal.

According to this configuration, the code replica is generated so that the frequency and the phase of the code replica coincide with the frequency and the phase of the positioning satellite signal.

Another embodiment of the invention relates to an electronic instrument comprising the above positioning device.

Another embodiment of the invention relates to a program causing a computer included in a positioning device to execute the above positioning method.

A further embodiment of the invention relates to a computer-readable storage medium storing the above program.

The term "storage medium" used herein refers to a storage medium (e.g., hard disk, MO, CD-ROM, DVD, memory card, or IC memory) from which information stored therein can be read by a computer.

Preferred embodiments of the invention are described below with reference to the drawings. Embodiments in which the invention is applied to a portable telephone having a GPS positioning function are given below. Note that embodiments to which the invention may be applied are not limited thereto.

Configuration

Figure 1:
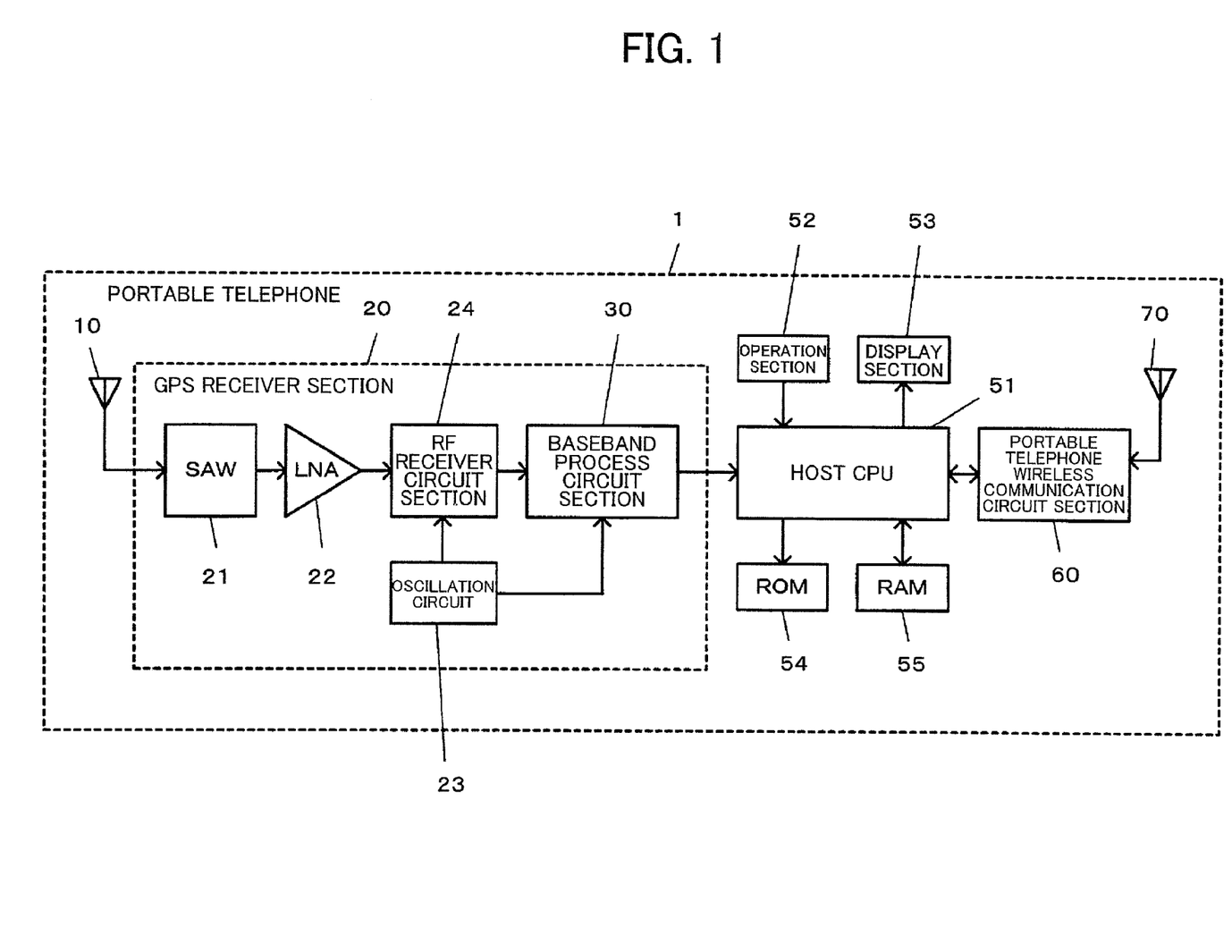
FIG. 1 is a circuit configuration diagram showing a portable telephone.

FIG. 1 is a block diagram showing the internal configuration of a portable telephone 1 according to one embodiment of the invention. As shown in FIG. 1, the portable telephone 1 includes a GPS antenna 10, a GPS receiver section (i.e., positioning circuit) 20, a host central processing unit (CPU) 51, an operation section 52, a display section 53, a read-only memory (ROM) 54, a random access memory (RAM) 55, a portable telephone wireless communication circuit section 60, and a portable telephone antenna 70.

The GPS antenna 10 is an antenna that receives an RF signal including a GPS satellite signal transmitted from a GPS satellite. The GPS antenna 10 outputs the received RF signal.

The GPS receiver section 20 acquires and extracts the GPS satellite signal from the RF signal received by the GPS antenna 10, and calculates the present position of the portable telephone 1 by performing positioning calculations based on a navigation message extracted from the GPS satellite signal and the like. The GPS receiver section 20 includes a surface acoustic wave (SAW) filter 21, a low-noise amplifier (LNA) 22, an oscillation circuit 23, a radio frequency (RF) receiver circuit section 24, and a baseband process circuit section 30. The RF receiver circuit section 24 and the baseband process circuit section 30 of the GPS receiver section 20 may be produced as different large scale integrated (LSI) circuits, or may be produced in one chip. The entire GPS receiver section 20 including the SAW filter 21, the LNA 22, and the oscillation circuit 23 may be produced in one chip.

The SAW filter (bandpass filter) 21 allows a given band component (signal) of the RF signal input from the GPS antenna 10 to pass through while blocking a frequency component outside the given band, and outputs the resulting signal. The LNA (low-noise amplifier) 22 amplifies the signal input from the SAW filter 21, and outputs the amplified signal. The oscillation circuit 23 is a crystal oscillator or the like. The oscillation circuit 23 generates and outputs an oscillation signal having a given oscillation frequency.

The RF receiver circuit section 24 multiplies (synthesizes) the signal input from the LNA 22 by a signal obtained by dividing or multiplying the frequency of the oscillation signal input from the oscillation circuit 23 to down-convert the signal input from the LNA 22 into an intermediate-frequency signal (IF signal), converts the IF signal into a baseband signal (i.e., I and Q signals are orthogonal to each other) by means of quadrature demodulation, converts the baseband signal into a digital signal, and outputs the resulting digital signal.

The baseband process circuit section 30 acquires and tracks the GPS satellite signal from the IF signal (quadrature signal) input from the RF receiver circuit section 24, and performs pseudo-range calculations, positioning calculations, and the like based on a navigation message, time information, and the like extracted by decoding data contained in the GPS satellite signal.

Figure 2:
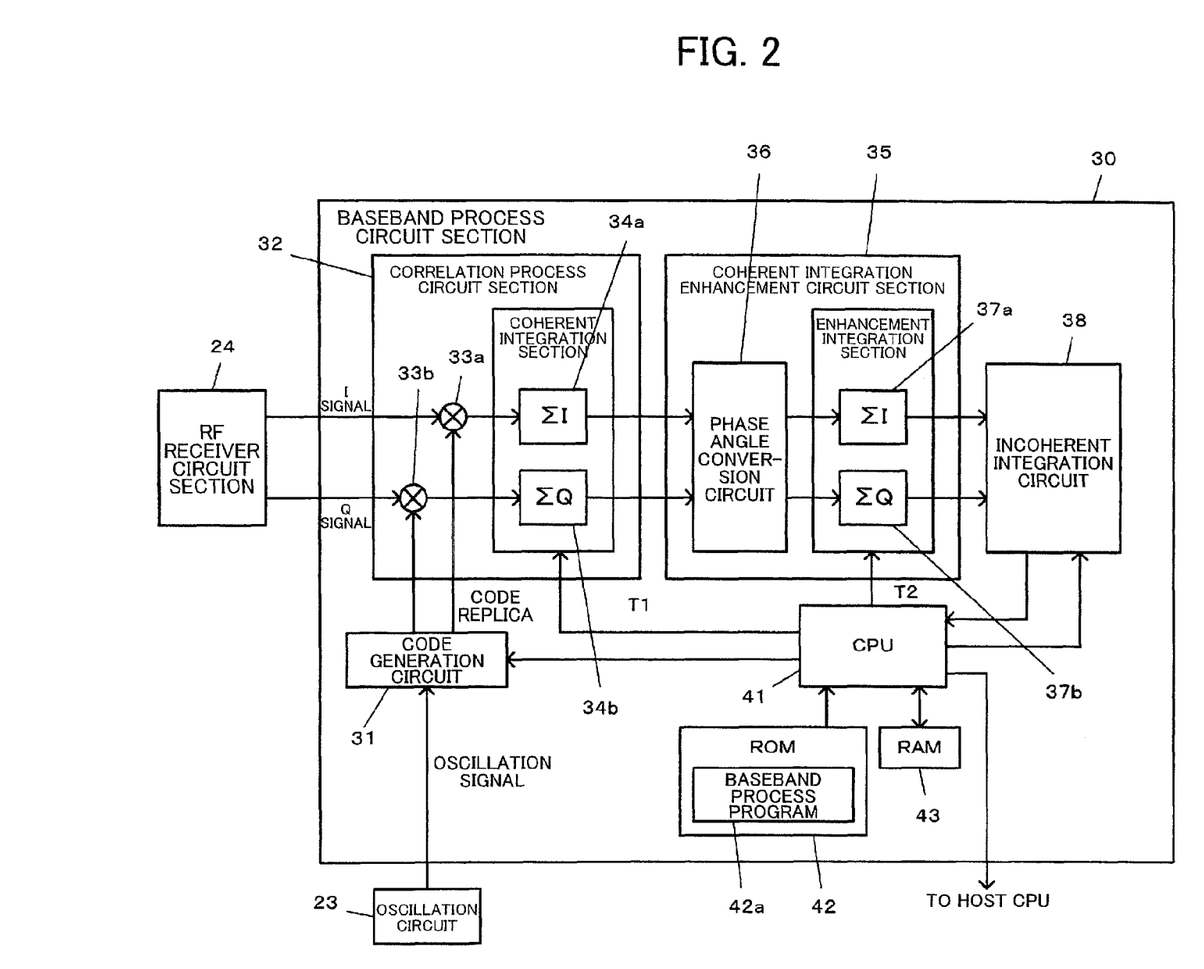
FIG. 2 is a circuit configuration diagram showing a baseband process circuit section.

FIG. 2 is a block diagram showing the circuit configuration of the baseband process circuit section 30. As shown in FIG. 2, the baseband process circuit section 30 includes a code generation circuit 31, a correlation process circuit section 32, a coherent integration enhancement circuit section 35, an incoherent integration circuit 38, a CPU 41, a ROM 42, and a RAM 43.

The code generation circuit 31 generates a code replica (C/A code replica) having a given frequency and a given phase using the oscillation signal generated by the oscillation circuit 23 according to a control signal output from the CPU 41.

The correlation process circuit section 32 includes mixers 33a and 33b and coherent integration sections 34a and 34b. The correlation process circuit section 32 performs a coherent integration process on the quadrature signal (i.e., the I and Q signals) input from the RF receiver circuit section 24 and the code replica input from the code generation circuit 31 over a given integration time T1 by means of FFT, for example.

The mixers 33a and 33b respectively multiply (synthesize) the I and Q signals input from the RF receiver circuit section 24 by the code replica input from the code generation circuit 31 to calculate correlation values. The coherent integration sections 34a and 34b integrate the correlation values obtained by the mixers 33a and 33b, respectively. The coherent integration sections 34a and 34b output the integrated values (integrated correlation values) to the coherent integration enhancement circuit section 35 each time the given integration time T1 has elapsed, and then clear the integrated values. The CPU 41 sets the integration time T1 to be less than 20 ms (about 10 to 20 ms).

The coherent integration enhancement circuit section 35 includes a phase angle conversion circuit 36 and enhancement integration sections 37a and 37b. The coherent integration enhancement circuit section 35 converts the phase angle θ of each of the integrated correlation values (I and Q integrated correlation values) of the I and Q signals input from the coherent integration sections 34a and 34b into a double angle, and integrates the resulting integrated correlation values.

The phase angle conversion circuit 36 creates a vector (integrated correlation value) in an IQ coordinate system using the I and Q integrated correlation values input from the correlation process circuit section 32 as coordinate values, and converts the phase angle θ of the vector (integrated correlation value) in the IQ coordinate system into a double angle. The phase angle conversion circuit 36 that converts the phase angle θ into a double angle is a circuit that calculates the left side of the following equation (2). Specifically, when the integrated correlation value in the IQ coordinate system is referred to as a vector v shown by the following equation (1), the phase angle conversion circuit 36 calculates the square of the vector v, and divides the resulting value by the magnitude of the vector v. A vector obtained by converting the phase angle of the vector v shown by the equation (1) into a double angle can be calculated, as indicated by the right side of the equation (2).

$$v = A \cdot \exp(j\theta) \quad (1)$$

$$\frac{v \cdot v}{|v|} = \frac{A \cdot \exp(j\theta) \cdot A \cdot \exp(j\theta)}{|A \cdot \exp(j\theta)|} \quad (2)$$
$$= \frac{A \cdot A \cdot \exp(j2\theta)}{A}$$
$$= A \cdot \exp(j2\theta)$$

The enhancement integration sections 37a and 37b respectively integrate the I and Q integrated correlation values that are IQ coordinate values of the integrated correlation values of which the phase angle θ has been converted by the phase angle conversion circuit 36. The enhancement integration sections 37a and 37b output the integrated values (enhanced integrated correlation values) to the incoherent integration circuit 38 each time a given integration time T2 has elapsed, and then clear the integrated values. The CPU 41 sets the integration time T2 to be longer than the integration time T1.

The incoherent integration section 38 performs an incoherent integration process on the integrated correlation values input from the coherent integration enhancement circuit section 35. Specifically, the incoherent integration section 38 synthesizes the enhanced integrated correlation values (I and Q enhanced integrated correlation values) of the I and Q signals input from the coherent integration enhancement circuit section 35, and integrates the absolute values (magnitudes) of the correlation values. The incoherent integration section 38 outputs the integrated value to the CPU 41 at given positioning intervals (e.g., intervals of one second). The integration time of the incoherent integration circuit 38 is variably set by the CPU 41. When a sufficient correlation value is obtained by integration by the coherent integration enhancement circuit section 35, the enhanced integrated correlation values input from the coherent integration enhancement circuit section 35 may be output to the CPU 41 without subjecting the enhanced integrated correlation values to incoherent integration by setting the incoherent integration time to be zero or a minimum value.

The CPU 41 controls each section of the baseband process circuit section 30, and performs various calculations including a baseband process. In the incoherent process, the CPU 41 specifies a GPS satellite signal based on the integrated value obtained by the incoherent integration process performed by the incoherent integration circuit 38 to acquire the GPS satellite signal. The CPU 41 then tracks the acquired GPS satellite signal. The CPU 41 synchronously holds a plurality of acquired GPS satellite signals in parallel. For example, the CPU 41 performs a code loop process that is implemented by a delay locked loop (DLL) and tracks the phase of the C/A code, and a carrier loop process that is implemented by a phase locked loop (PLL) and tracks the phase of the carrier frequency. The CPU 41 extracts the navigation message by decoding data contained in each GPS satellite signal that has been tracked, and performs pseudo-range calculations, positioning calculations, and the like to locate the present position. The CPU 41 controls the code generation section 31 to generate a code replica corresponding to the acquisition target GPS satellite signal while changing the signal frequency and the phase of the code replica. This makes it possible to acquire and track the GPS satellite signal based on the integrated value output from the incoherent integration section 38. The CPU 41 allows the reception frequency of the GPS satellite signal to coincide with the frequency of the code replica signal, and allows the phase of the C/A code contained in the received GPS satellite signal to coincide with the phase of the code replica, based on the integrated value output from the incoherent integration section 38 and the like.

The ROM 42 stores a system program that causes the CPU 41 to control each section of the baseband process circuit section 30 and the RF receiver circuit section 24, various programs and data necessary for implementing various processes including the baseband process, and the like.

In this embodiment, the ROM 42 stores a baseband process program 42a that causes the CPU 41 to perform the baseband process.

The RAM 43 is used as a work area for the CPU 41, and temporarily stores a program and data read from the ROM 42, calculations results obtained by the CPU 41 based on various programs, and the like.

Again referring to FIG. 1, the host CPU 51 controls each section of the portable telephone I based on various programs such as the system program stored in the ROM 54. Specifically, the host CPU 51 mainly implements a telephone call function, and performs a process which implements various functions including a navigation function such as causing the display section 53 to display a navigation screen in which the present position of the portable telephone 1 input from the baseband process circuit section 30 is plotted on a map.

The operation section 52 is an input device including an operation key, a button switch, and the like. The operation section 52 outputs an operation signal corresponding to an operation of the user to the host CPU 51. Various instructions such as a positioning start/finish instruction are input by operating the operation section 52. The display section 53 is a display device such as a liquid crystal display (LCD). The display section 53 displays a display screen (e.g., navigation screen and time information) based on a display signal input from the host CPU 51.

The ROM 54 stores a system program that causes the host CPU 51 to control the portable telephone 1, a program and data necessary for implementing a navigation function, and the like. The RAM 55 is used as a work area for the host CPU 51. The RAM 55 temporarily stores a program and data read from the ROM 54, data input from the operation section 52, calculation results obtained by the host CPU 51 based on various programs, and the like.

The portable telephone antenna 70 is an antenna which transmits and receives a portable telephone radio signal between the portable telephone 1 and a radio base station installed by a communication service provider of the portable telephone 1. The portable telephone wireless communication circuit section 60 is a portable telephone communication circuit section which includes an RF conversion circuit, a baseband process circuit, and the like, and transmits and receives a radio signal under control of the host CPU 51.

Experimental Results

In this embodiment, the coherent integration enhancement circuit section 35 converts the phase angle θ of each of the integrated correlation values (I and Q integrated correlation values) of the I and Q signals and the code replica calculated by the coherent integration by the correlation process circuit section 32 into a double angle, and further integrates the resulting integrated correlation values. The incoherent integration section 38 performs the incoherent integration process on the I and Q integrated correlation values calculated by the coherent integration enhancement circuit section 35. This prevents cancellation of the correlation value due to phase inversion (BBT) of the navigation message so that the coherent integration process can be performed for an integration time longer than 20 ms. The reasons therefor are described below with reference to signal processing results for a received signal.

FIGS. 3 to 11 show signal processing results for a received signal including a GPS satellite signal. FIGS. 3 to 11 are views showing the correlation peak corresponding to each integration unit time obtained by repeating the coherent integration process on the received signal and the code replica for a given integration unit time (PDI) of 20 ms or less.

Figure 3:
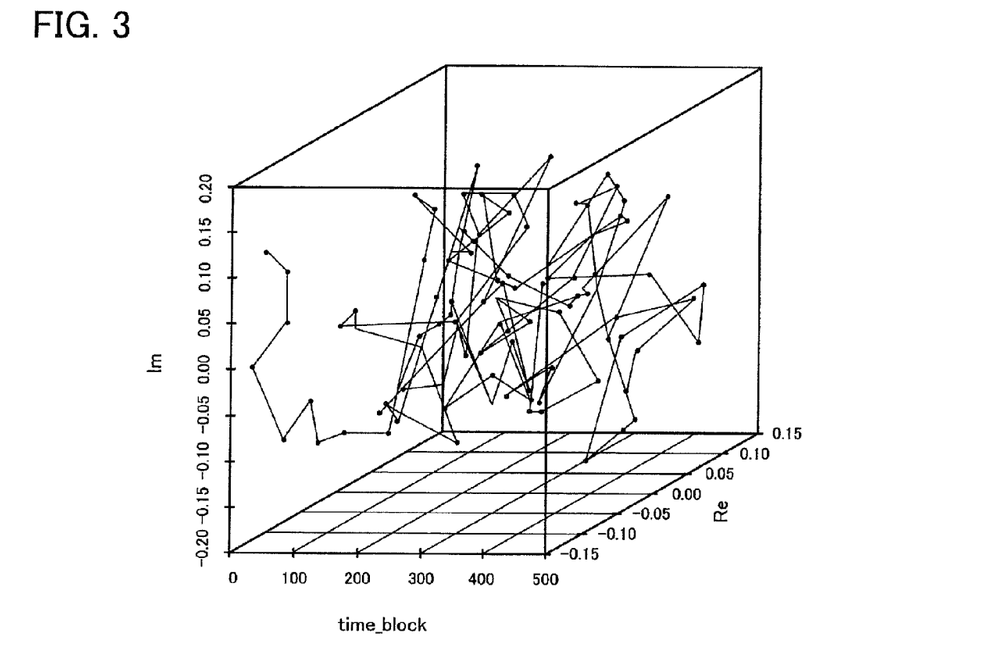
FIG. 3 is a view three-dimensionally showing correlation peaks in an asynchronous state.
Figure 4:
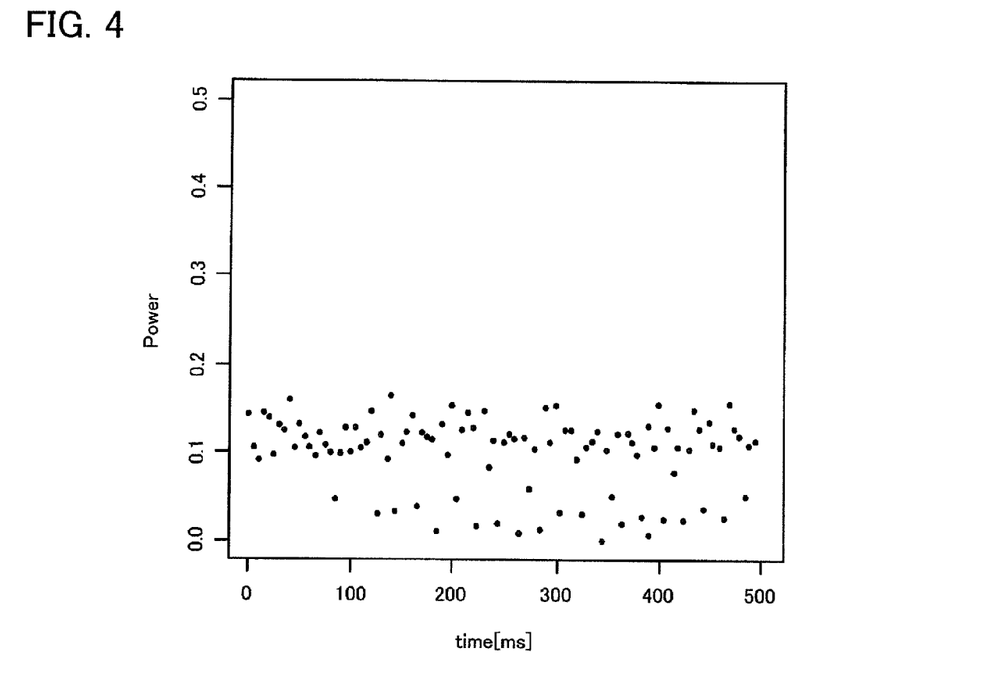
FIG. 4 is a view showing changes in correlation peaks in time series in an asynchronous state.
Figure 5:
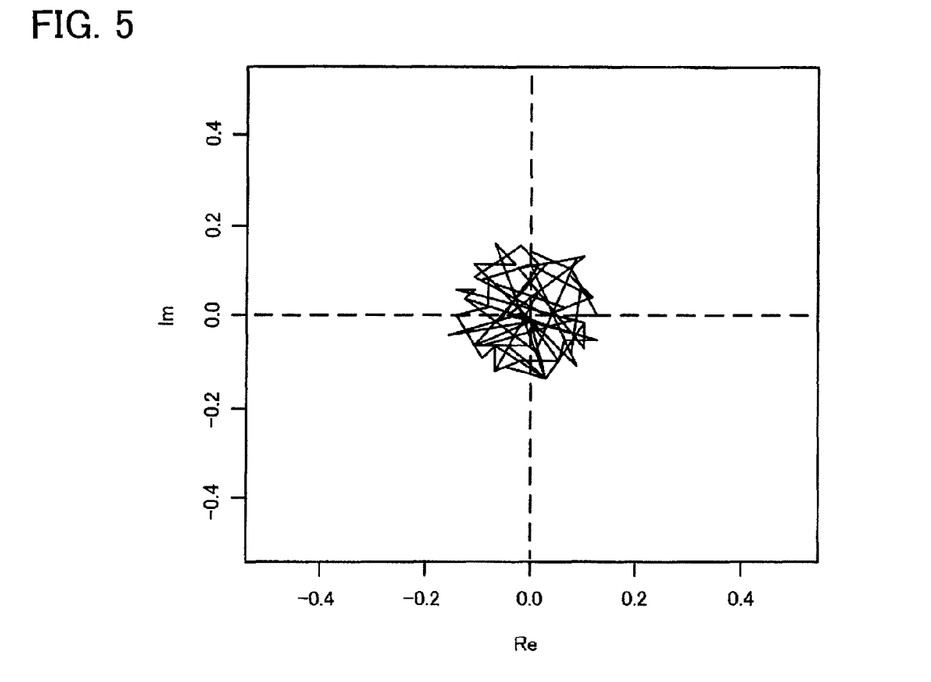
FIG. 5 is an IQ plot diagram showing correlation peaks in an asynchronous state.

FIGS. 3 to 5 show changes in correlation peak when the frequency of the code replica is almost synchronized with the carrier frequency of the GPS satellite signal included in the received signal, but the phases are not synchronized (asynchronous state). FIG. 3 is a view three-dimensionally showing changes in correlation peak in time series. Each correlation peak is plotted in FIG. 3, wherein the horizontal axis indicates time t, the vertical axis indicates the real part (component I) of the correlation value, and the depth indicates the imaginary part (component Q) of the correlation value. FIG. 4 is a view showing changes in correlation peak in time series. Each correlation peak is plotted in FIG. 4, wherein the horizontal axis indicates time t, and the vertical axis indicates the power of the correlation value. FIG. 5 is a view showing the IQ plot of the correlation peak. Each correlation peak is plotted in FIG. 5, wherein the horizontal axis indicates the real part Re (component I) of the correlation value, and the vertical axis indicates the imaginary part Im (component Q) of the correlation value.

As shown in FIG. 4, the correlation peaks are classified into the correlation peaks at about 0.1 and the correlation peaks at about 0.0. The correlation peaks at about 0.0 were obtained by integration across the phase inversion (BBT) timing of the navigation message. Therefore, the polarity of the correlation value was reversed and canceled. In the IQ coordinate system, the correlation peaks are dispersed around the origin, as shown in FIG. 5. Specifically, each IQ coordinate value may be positive or negative (i.e., the coordinate values are irregular). If the coherent integration time is increased in this state, the number of correlation peaks at about 0.1 decreases while the number of correlation peaks at about 0.0 increases. The correlation peaks at about 0.0 finally become predominant.

Figure 6:
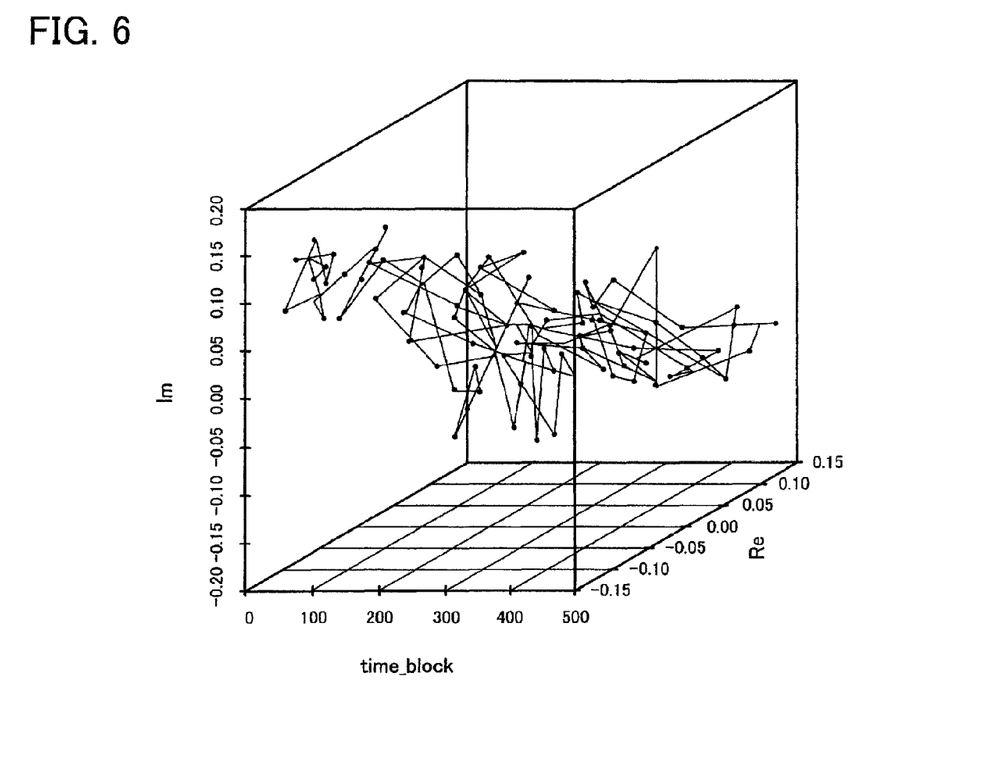
FIG. 6 is a view three-dimensionally showing correlation peaks in a synchronous state.
Figure 7:
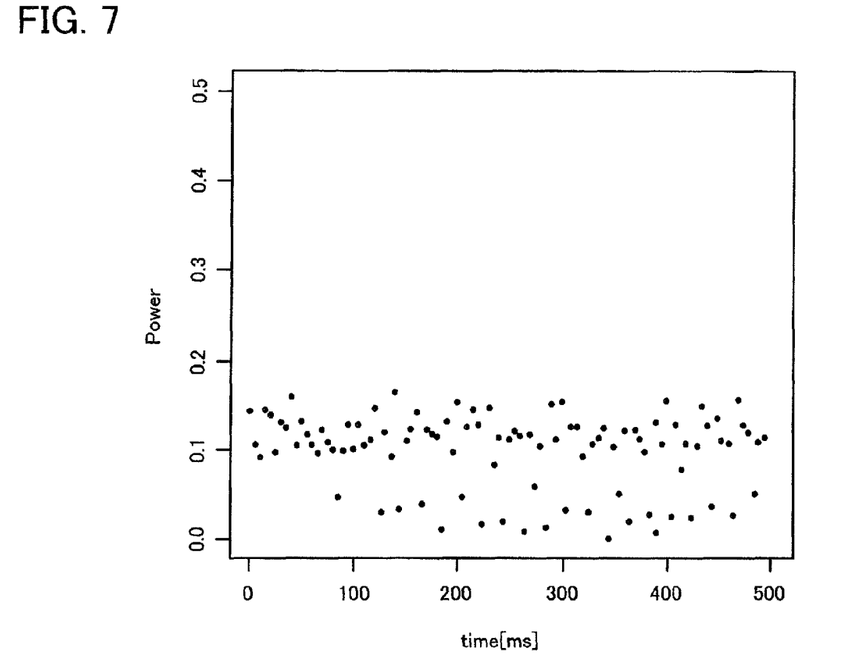
FIG. 7 is a view showing changes in correlation peaks in time series in a synchronous state.
Figure 8:
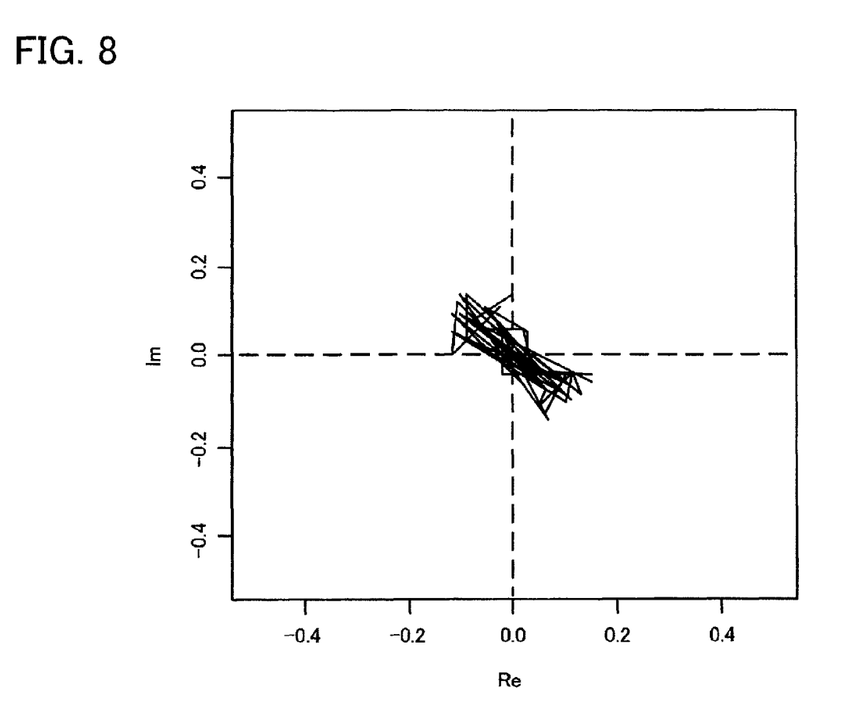
FIG. 8 is an IQ plot diagram showing correlation peaks in a synchronous state.
Figure 9:
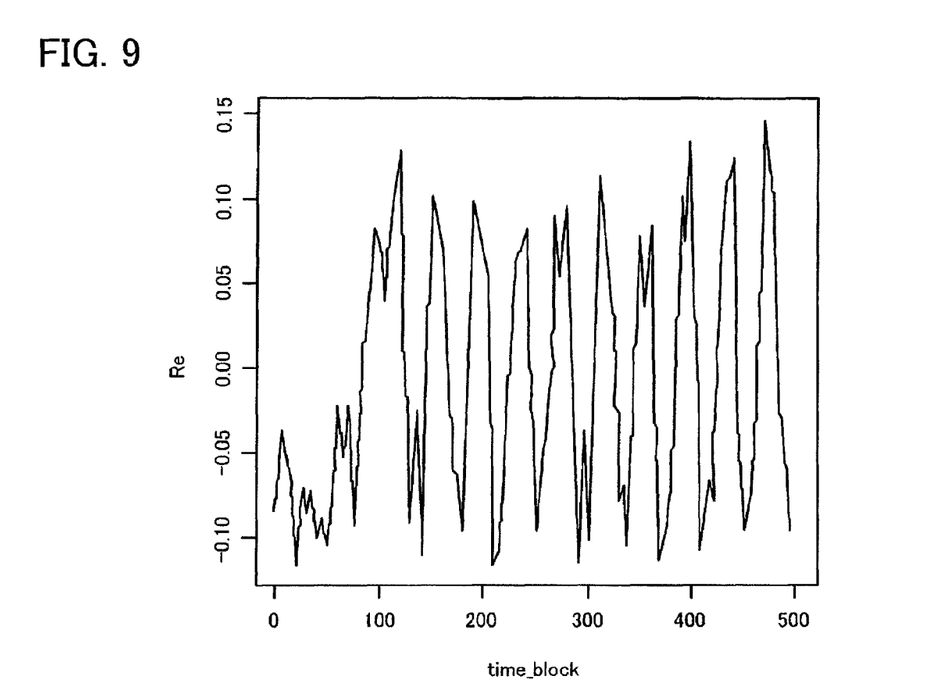
FIG. 9 is a view showing changes in the real part of a correlation peak in time series in a synchronous state.

FIGS. 6 to 9 show changes in correlation peak when the frequency and the phase of the code replica are almost synchronized with the carrier frequency and the phase of the GPS satellite signal included in the received signal (synchronous state). FIG. 6 is a view three-dimensionally showing changes in correlation peak in time series. Each correlation peak is plotted in FIG. 6, wherein the horizontal axis indicates time t, the vertical axis indicates the imaginary part Im (component Q) of the correlation value, and the depth indicates the real part Re (component I) of the correlation value. FIG. 7 is a view showing changes in correlation peak in time series. Each correlation peak is plotted in FIG. 7, wherein the horizontal axis indicates time t, and the vertical axis indicates the power of the correlation value. FIG. 8 is a view showing the IQ plot of the correlation peak. Each correlation peak is plotted in FIG. 8, wherein the horizontal axis indicates the real part Re (component I) of the correlation value, and the vertical axis indicates the imaginary part Im (component Q) of the correlation value. FIG. 9 is a view showing the real part of the correlation peak. Each correlation peak is plotted in FIG. 9, wherein the horizontal axis indicates time t, and the vertical axis indicates the real part Re (component I) of the correlation value.

As shown in FIG. 7, the correlation peaks are classified into correlation peaks at about 0.1 and correlation peaks at about 0.0 in the same manner as in the asynchronous state shown in FIG. 4. In the IQ coordinate system, the correlation peaks are symmetrically positioned around the origin, as shown in FIG. 8. Specifically, regularity that is not observed in the asynchronous state is observed in FIG. 8. The phases of the correlation peaks are shifted by 180 degrees. Regarding a change in I coordinate value of the correlation peak with time, the I coordinate value of the correlation peak is regularly reversed to positive or negative in the cycle of the phase inversion (BBT) of the navigation message, as shown in FIG. 9. This also applies to the Q coordinate value (not shown). Specifically, the correlation peaks are symmetrically positioned around the origin of the IQ coordinate system. Therefore, if the coherent integration time is increased in this state, the number of correlation peaks at about 0.0 increases in the same manner as in the asynchronous state. The correlation peaks at about 0.0 finally become predominant.

Figure 10:
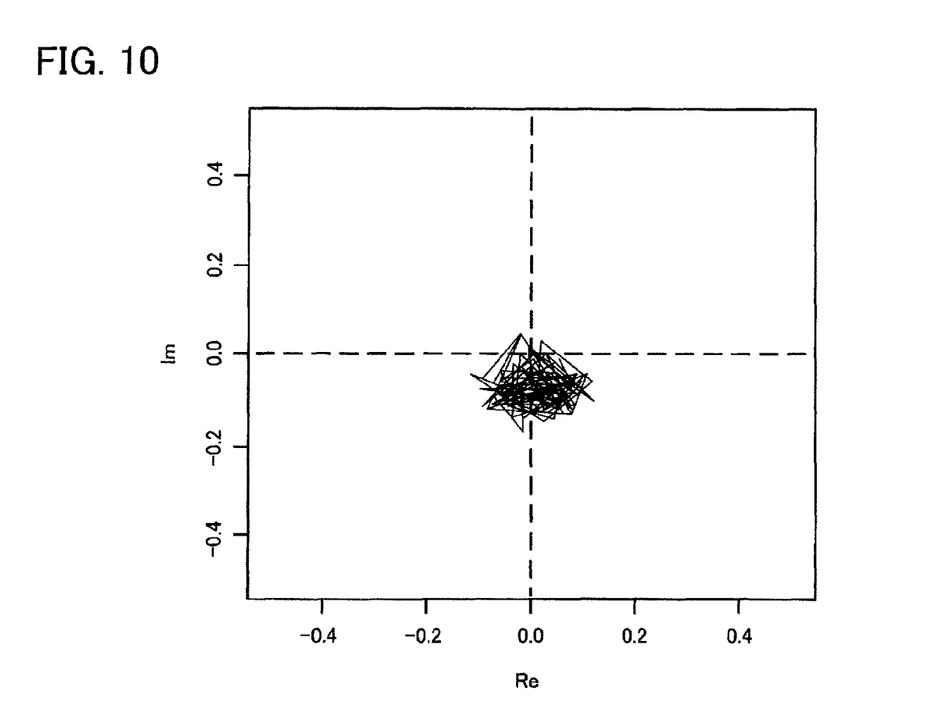
FIG. 10 is an IQ plot diagram showing correlation peaks in a synchronous state when converting the phase angle into a double angle.
Figure 11:
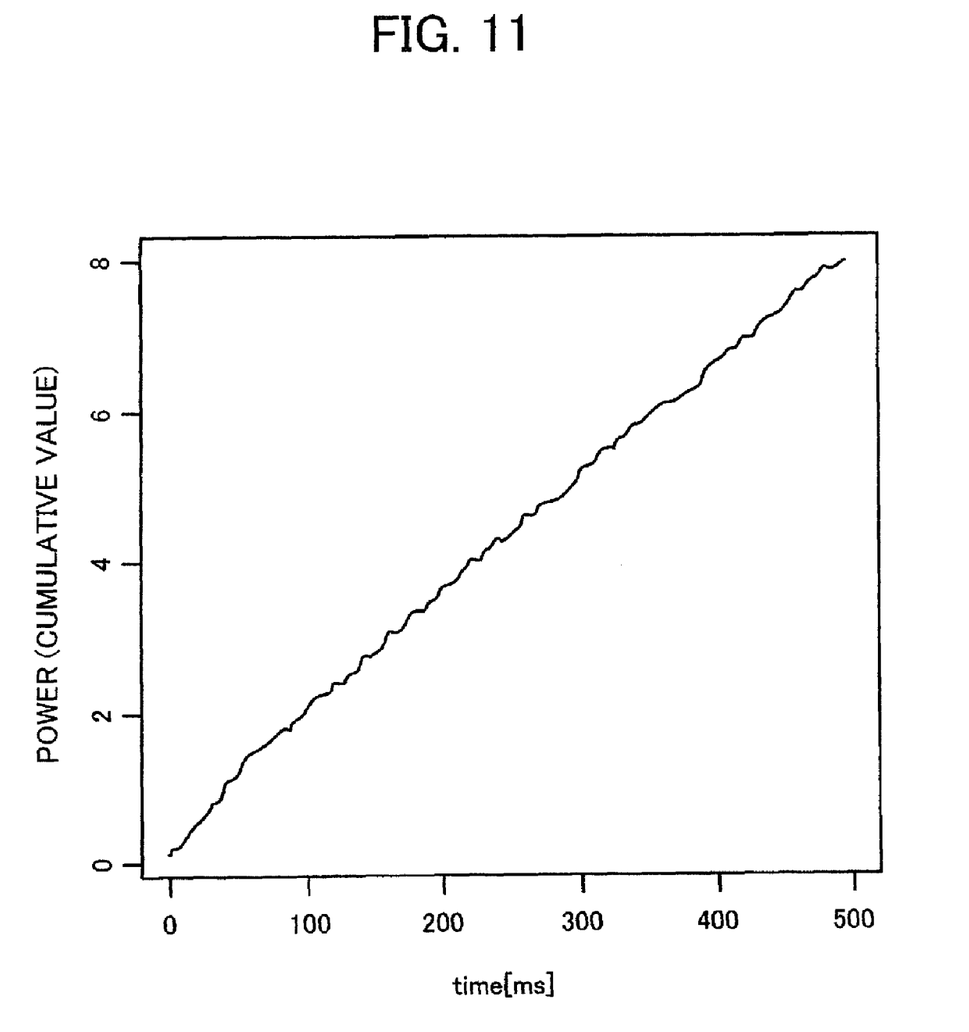
FIG. 11 shows an integrated value of a correlation peak in a synchronous state when converting the phase angle into a double angle.

FIGS. 10 and 11 show signal processing results in a synchronous state. FIGS. 10 and 11 show results obtained by converting the phase angle θ of each correlation peak shown in FIG. 6 into a double angle. FIG. 10 is a view showing the IQ plot of each correlation peak of which the phase angle θ was converted into a double angle (converted correlation peak). Each converted correlation peak is plotted in FIG. 10, wherein the horizontal axis indicates the real part Re (component I) of the correlation value, and the vertical axis indicates the imaginary part Im (component Q) of the correlation value. FIG. 11 is a view showing the integrated values of the converted correlation peaks. The integrated values (coherent integrated values) obtained by integrating (coherent integration) the converted correlation peaks (complex numbers) are plotted in FIG. 11, wherein the horizontal axis indicates time, and the vertical axis indicates the integrated value (cumulative value).

In the IQ coordinate system, the correlation peaks (converted correlation peaks) of which the phase angle θ was converted into a double angle have almost the same phase angle, as shown in FIG. 10. Regularity in which the correlation peaks became close to a specific value was observed. In the example shown in FIG. 10, most of the Q coordinate values of the converted correlation peaks are negative (about −0.8).

The I coordinate values may be positive or negative (about zero). Since the values are almost the same, the phase angles are also almost the same. Therefore, if the converted correlation peaks are integrated (accumulated), the integrated correlation value increases in proportion to the integration time, as shown in FIG. 11.

As is clear from the above results, cancellation of the correlation value due to phase inversion (BBT) of the navigation message can be prevented by converting the phase angle θ of the correlation peak calculated by the coherent integration process into a double angle and further integrating the resulting values, so that the coherent integration process can be performed for an integration time equal to or longer than 20 ms.

Operation

Figure 12:
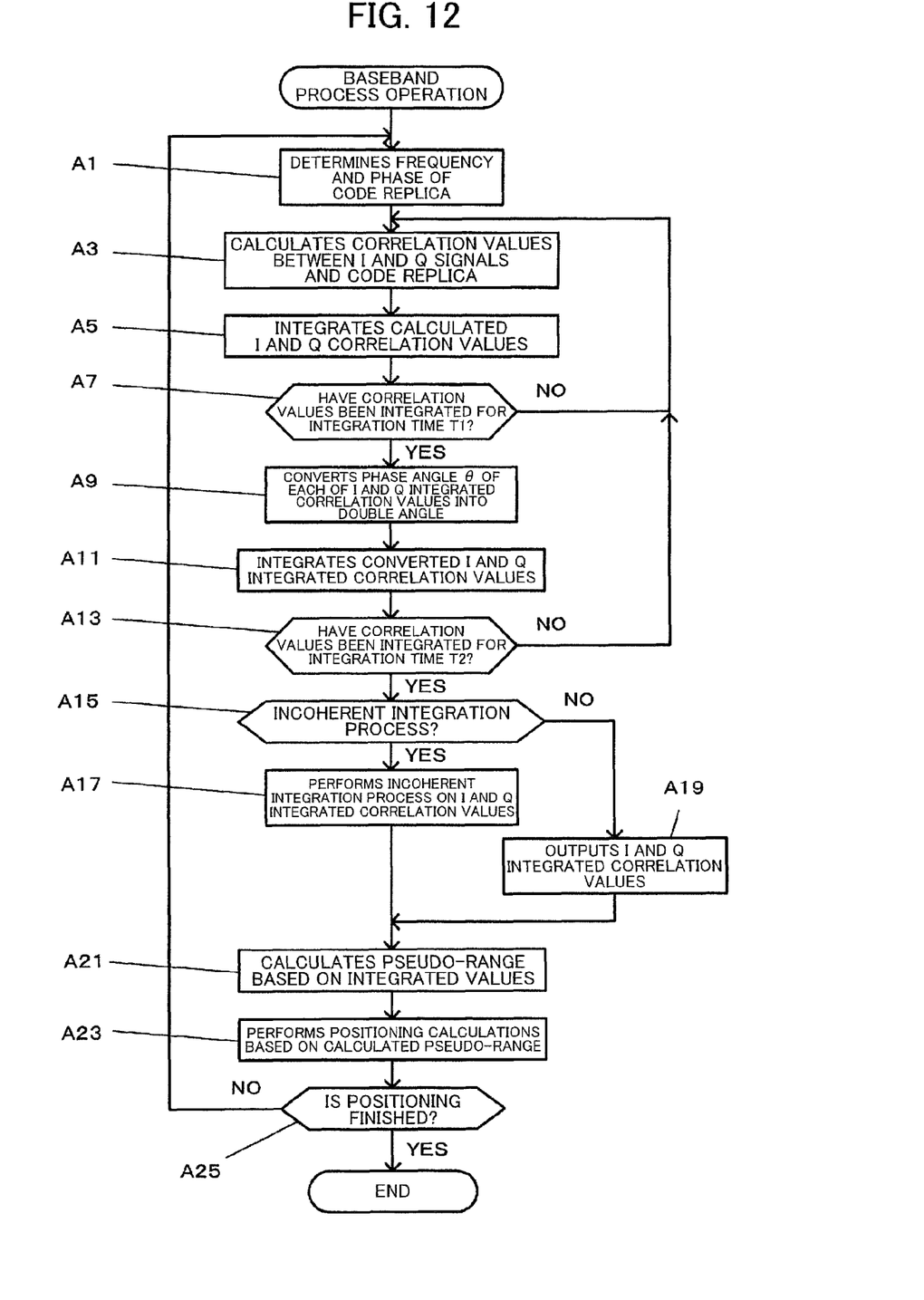
FIG. 12 is a flowchart showing a baseband process operation.

FIG. 12 is a view illustrative of the flow of the baseband process operation of the baseband process circuit section 30. As shown in FIG. 12, the CPU 41 of the baseband process circuit section 30 determines the frequency and the phase of the code replica signal corresponding to the acquisition target GPS satellite signal, and outputs a setting signal to the code generation circuit 31 (step A1). The mixers 33a and 33b respectively synthesize the I and Q signals input from the RF receiver circuit section 24 with the code replica input from the code generation circuit 31 to calculate correlation values (step A3). The coherent integration sections 34a and 34b respectively integrate the correlation values calculated by the mixers 33a and 33b (step A5). When the correlation values have not been integrated for the integration time T1 (step A7: NO), the baseband process circuit section 30 returns to the step A3.

When the correlation values have been integrated for the integration time T1 (step A7: YES), the coherent integration sections 34a and 34b output the integrated values (integrated correlation values) to the phase angle conversion circuit 36, and then clear the integrated values. The phase angle conversion circuit 36 converts the phase angle θ of each of the integrated correlation values (i.e., the I and Q integrated correlation values are IQ coordinate values) input from the coherent integration sections 34a and 34b into a double angle (step A9). The enhancement integration sections 37a and 37b integrate the I and Q integrated correlation values (i.e., the IQ coordinate values of the integrated correlation values of which the phase angle has been converted by the phase angle conversion circuit 36) (step A11). When the integrated correlation values have not been integrated for the integration time T2 (step A13: NO), the baseband process circuit section 30 returns to the step A3.

When the integrated correlation values have been integrated for the integration time T2 (step A13: YES), the CPU 41 determines whether or not to perform the incoherent integration process, and controls the incoherent integration circuit 38 based on the determination result. When the CPU 41 has determined to perform the incoherent integration process (step A15: YES), the incoherent integration circuit 38 performs the incoherent integration process (step A17). Specifically, the incoherent integration circuit 38 repeats a process that synthesizes the I and Q integrated correlation values input from the enhancement integration sections 37a and 37b, and integrates the absolute values (magnitudes) of the correlation values for a given integration time T3. When the CPU 41 has determined that the incoherent integration process is unnecessary (step A15: NO), the incoherent integration circuit 38 outputs the I and Q integrated correlation values (or absolute values (magnitude)) input from the coherent integration enhancement circuit section 35 to the CPU 41 (step A19).

The CPU 41 calculates the pseudo-range based on the integrated value input from the incoherent integration circuit 38 (step A21), performs positioning calculations based on the calculated pseudo-range to calculate the present position, and outputs the calculated present position to the host CPU 51 (step A23). When positioning is not finished (step A25: NO), the baseband process circuit section 30 returns to the step A1. When positioning is finished (step A25: YES), the baseband process circuit section 30 finishes the operation. Positioning is finished when a positioning finish instruction has been issued from the host CPU 51 in response to an instruction operation that causes the navigation function to be turned OFF or an instruction operation that removes power, for example.

Effects

According to this embodiment, the integrated correlation values (I and Q integrated correlation values) (i.e., the integrated correlation values of the I and Q signals obtained from the received signal and the code replica are IQ coordinate values) are calculated by the coherent integration process by the correlation process circuit section 32, and the phase angle conversion circuit 36 converts the phase angle θ of the integrated correlation value into a double angle. The I and Q integrated correlation values (i.e., the IQ coordinate values of the converted integrated correlation values) are further integrated to calculate I and Q enhanced integrated correlation values. The incoherent integration process is performed on the I and Q enhanced integrated correlation values calculated by the coherent integration enhancement circuit section 35. This prevents cancellation of the correlation value due to phase inversion (BBT) of the navigation message so that the coherent integration process can be performed for an integration time longer than 20 ms. As a result, the time required for signal acquisition can be reduced as compared with related-art technology in which the coherent integration time is limited to 20 ms or less, whereby the reception sensitivity can be improved.

Modification

Embodiments to which the invention may be applied are not limited to the above-described embodiments. Various modifications and variations may be made without departing from the spirit and scope of the invention.

(A) Variable Coherent Integration Time T2

For example, the integration time T2 of the coherent integration enhancement circuit section 35 may be changed. The CPU 41 changes the integration time T2.

(A-1) Startup Time of Positioning Circuit

Figure 13:
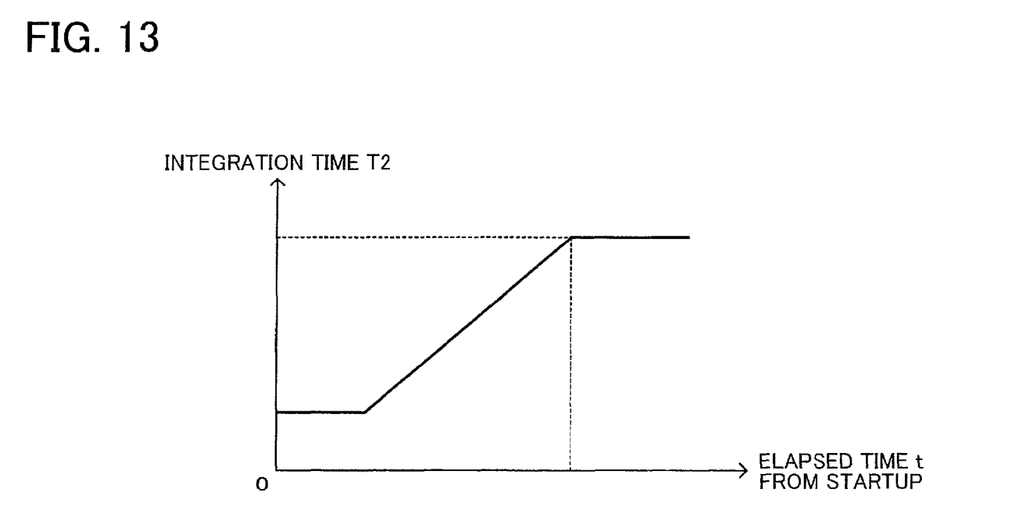
FIG. 13 shows an example of the relationship between the startup time of a positioning circuit and an integration time T2 according to a modification.

An elapsed time t from the startup of the baseband process circuit section 30 (positioning circuit) is measured, and the integration time T2 is changed corresponding to the elapsed time t. FIG. 13 shows an example of the relationship between the elapsed time t from startup and the integration time T2. FIG. 13 shows a graph in which the horizontal axis indicates the elapsed time t and the vertical axis indicates the integration time T2. In FIG. 13, the integration time T2 increases as the elapsed time t increases. Specifically, since a change in temperature due to heat generation caused by circuit operation and the like occurs immediately after the baseband process circuit section 30 starts operation, the oscillation state of the oscillation circuit 23 is unstable. Therefore, the integration time T2 is increased as the elapsed time t increases.

(A-2) Oscillation State of Oscillation Circuit

The integration time T2 may be changed corresponding to the oscillation state of the oscillation circuit 23. Specifically, a change in the oscillation signal is determined by comparing the frequency of the oscillation signal output from the oscillation circuit 23 with the frequency of the received signal, and the integration time T2 is changed corresponding to the change in the oscillation signal that has been determined.

Figure 14:
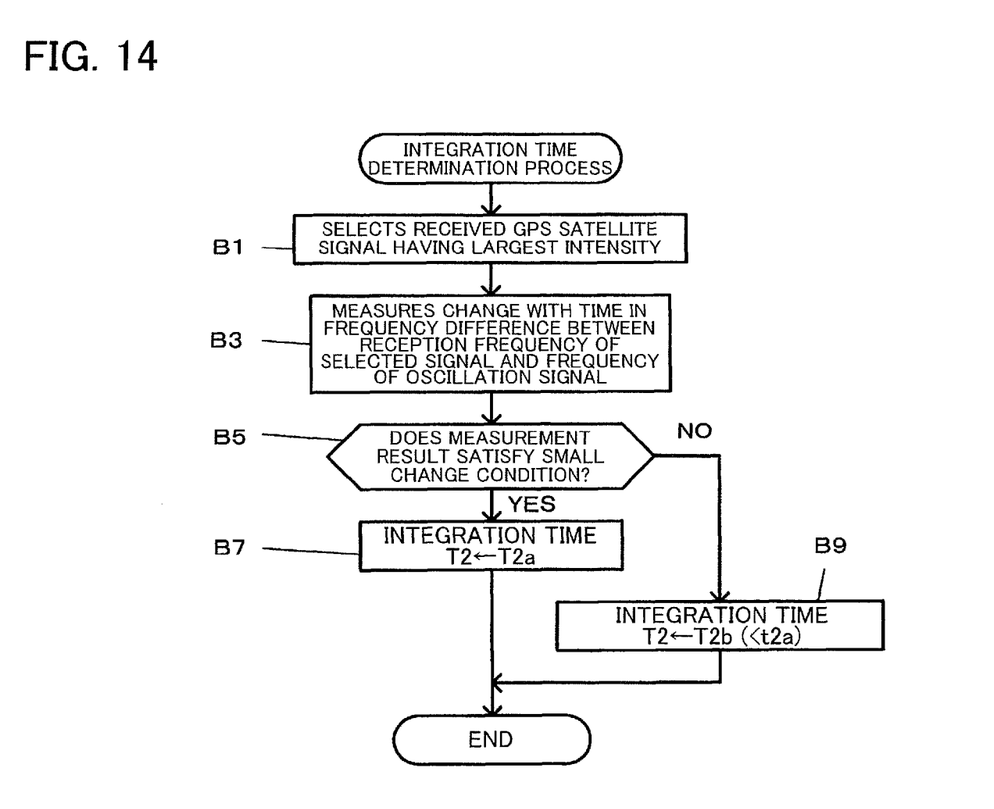
FIG. 14 is a flowchart showing an integration time determination process according to a modification.

FIG. 14 shows an example of an integration time determination process employed in this case. As shown in FIG. 14, the CPU 41 selects a GPS satellite signal having the largest intensity from GPS satellite signals included in the received signals (step B1). The CPU 41 measures a change (change with time) in the difference (frequency difference) between the frequency of the selected GPS satellite signal and the frequency of the oscillation signal output from the oscillation circuit 23 within a given period of time (step B3). The CPU 41 determines whether or not the measured change in frequency difference with time satisfies a given small change condition. When the small change condition is satisfied (i.e., a change in the oscillation signal is small) (step B5: YES), the integration time T2 is set at a given time T2*a* (step B7). When the small change condition is not satisfied (i.e., a change in the oscillation signal is large) (step B5: NO), the integration time T2 is set at a given time T2*b* (step B9). Note that T2*a*>T2*b*.

(B) Positioning Circuit

The above embodiments have been described taking an example of a portable telephone (i.e., an electronic instrument including a positioning device). Note that the invention may also be applied to other electronic instruments such as a portable navigation system, a car navigation system, a personal digital assistant (PDA), and a wristwatch.

(C) Satellite Positioning System

The above embodiments have been described taking an example utilizing the GPS. Note that the invention may also be applied to other satellite positioning systems such as the global navigation satellite system (GLONASS).

(D) Storage Medium

The baseband process program 42*a* may be recorded on a recording medium such as a CD-ROM, and installed in an electronic instrument such as a portable telephone.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A coherent integration enhancement method comprising:
    converting a phase angle of each of integrated correlation values in a quadrature coordinate system into a double angle, the integrated correlation values being obtained by a correlation process circuit that calculates correlation values between quadrature signals of a received positioning satellite signal and a code replica of a pseudo random noise (PRN) code and performs a coherent integration process on the correlation values; and
    integrating the integrated correlation values of which the phase angle has been converted into a double angle.

2. The coherent integration enhancement method as defined in claim 1,
    the positioning satellite signal being a signal that has been subjected to binary phase shift keying (BPSK) modulation;
    the correlation process circuit being a circuit that performs the coherent integration process for a given unit time shorter than the phase modulation cycle; and
    the integrating of the integrated correlation values including integrating the integrated correlation values for a period of time longer than the phase modulation cycle.

3. The coherent integration enhancement method as defined in claim 1,
    the method further including variably setting an integration time of the integrated correlation values,
    the integrating of the integrated correlation values including integrating the integrated correlation values for the set integration time.

4. The coherent integration enhancement method as defined in claim 3, the setting of the integration time including variably setting the integration time based on a period of time elapsed after the coherent integration enhancement method has been executed.

5. The coherent integration enhancement method as defined in claim 3, the method further including:

generating the code replica using an oscillation signal generated by a local oscillator; and determining whether or not a change in the oscillation signal generated by the local oscillator satisfies a change state condition used to determine whether or not appropriate positioning can be performed using the integration results of the integrated correlation values based on the received positioning satellite signal, the setting of the integration time including variably setting the integration time based on the determination result.

6. The coherent integration enhancement method as defined in claim 5, the generating of the code replica including generating the code replica so that the frequency and the phase of the generated code replica coincide with the frequency and the phase of the received positioning satellite signal.

7. A positioning method comprising the coherent integration enhancement method as defined in claim 1, the positioning method further including:

calculating a pseudo-range between a positioning satellite that has transmitted the positioning satellite signal and a reception position based on a calculation result obtained using the coherent integration enhancement method; and calculating a present position based on the calculated pseudo-range.

8. A computer-readable storage medium storing a program that causes a computer included in a positioning device to:

convert a phase angle of each of integrated correlation values in a quadrature coordinate system into a double angle, the integrated correlation values being obtained by a correlation process circuit that calculates correlation values between quadrature signals of a received positioning satellite signal and a code replica of a pseudo random noise (PRN) code and subjects the correlation values to coherent integration; and integrate the integrated correlation values of which the phase angle has been converted into a double angle.

9. A coherent integration enhancement circuit comprising:

a phase angle conversion section that converts a phase angle of each of integrated correlation values in a quadrature coordinate system into a double angle, the integrated correlation values being obtained by a correlation process circuit that calculates correlation values between quadrature signals of a received positioning satellite signal and a code replica of a pseudo random noise (PRN) code and performs a coherent integration process on the correlation values; and an integration section that integrates the integrated correlation values of which the phase angle has been converted by the phase angle conversion section.

10. A positioning circuit comprising:

the coherent integration enhancement circuit as defined in claim 9;

a pseudo-range calculation section that calculates a pseudo-range between a positioning satellite that has transmitted the positioning satellite signal and a reception position based on a calculation result obtained by the coherent integration enhancement circuit; and a positioning calculation section that calculates a present position based on the calculated pseudo-range.

11. An electronic instrument comprising the positioning circuit as defined in claim 10.

* * * * *